United States Patent
Oberberger et al.

(10) Patent No.: US 10,740,753 B2
(45) Date of Patent: Aug. 11, 2020

(54) GAMING SYSTEM WITH SECURE ELECTRONIC PAYMENT COUPON REDEMPTION

(75) Inventors: Michael M. Oberberger, Franklin, TN (US); Ben Lechlitner, Nashville, TN (US); Chris Jarrell, Nolensville, TN (US); John M. Plunkett, Nashville, TN (US); Christopher John Thacker, Las Vegas, NV (US); Daniel William Milligan, Palmyra, VA (US)

(73) Assignee: VIDEO GAMING TECHNOLOGIES, INC., Franklin, TN (US)

( * ) Notice: Subject to any disclaimer, the term of this patent is extended or adjusted under 35 U.S.C. 154(b) by 1124 days.

(21) Appl. No.: 13/597,685

(22) Filed: Aug. 29, 2012

(65) Prior Publication Data

US 2014/0067688 A1 Mar. 6, 2014

(51) Int. Cl.
G06Q 20/38 (2012.01)
G06Q 20/40 (2012.01)
G07F 17/32 (2006.01)

(52) U.S. Cl.
CPC ......... *G06Q 20/3827* (2013.01); *G06Q 20/40* (2013.01); *G07F 17/3251* (2013.01)

(58) Field of Classification Search
CPC ........... G06Q 10/06313; G06Q 30/018; G06Q 20/32; G06Q 20/40; G06F 21/31; G06F 21/602

See application file for complete search history.

(56) References Cited

U.S. PATENT DOCUMENTS

| | | |
|---|---|---|
| 5,265,874 A | 11/1993 | Dickinson et al. |
| 5,290,033 A | 3/1994 | Bittner et al. |
| 5,429,361 A | 7/1995 | Raven et al. |
| 5,470,079 A | 11/1995 | LeStrange et al. |
| 5,960,086 A * | 9/1999 | Atalla ............... H04L 9/0891 380/44 |
| 6,048,269 A | 4/2000 | Burns et al. |
| 6,729,957 B2 | 5/2004 | Burns et al. |
| 6,729,958 B2 | 5/2004 | Burns et al. |
| 6,736,725 B2 | 5/2004 | Burns et al. |
| 7,275,991 B2 | 10/2007 | Burns et al. |
| 2003/0144965 A1 * | 7/2003 | Prasad ............... G06Q 20/382 705/65 |

(Continued)

*Primary Examiner* — Johann Y Choo
(74) *Attorney, Agent, or Firm* — Armstrong Teasdale LLP

(57) ABSTRACT

A cryptographic key is associated with an identifier (ID) of an electronic gaming machine (EGM). A computing device receives a coupon redemption request including an electronic payment coupon having the EGM ID and a credit amount. The computing device authenticates the electronic payment coupon based at least in part on the cryptographic key associated with the EGM ID and transmits a redemption confirmation when the electronic payment coupon is successfully authenticated. The computing device also stores a cancellation associated with the electronic payment coupon. The cancellation indicates that the electronic payment coupon has been redeemed for the credit amount. Such an electronic payment coupon may, for example, be generated by an EGM and/or be redeemed using an EGM and/or any other computing device capable of receiving the electronic payment coupon, transmitting a redemption request, and providing the credit amount to a user.

9 Claims, 5 Drawing Sheets

(56) References Cited

U.S. PATENT DOCUMENTS

| | | | |
|---|---|---|---|
| 2003/0176218 A1* | 9/2003 | LeMay | G07F 17/32 463/25 |
| 2009/0117883 A1* | 5/2009 | Coffing et al. | 455/414.1 |
| 2010/0180130 A1* | 7/2010 | Stahl | G06F 21/10 713/193 |
| 2010/0216543 A1 | 8/2010 | Nulph | |
| 2010/0250796 A1* | 9/2010 | Jevans et al. | 710/36 |
| 2011/0264586 A1* | 10/2011 | Boone et al. | 705/67 |
| 2011/0302023 A1* | 12/2011 | Thye | G06Q 30/0236 705/14.36 |
| 2012/0196683 A1 | 8/2012 | Sprinkle | |
| 2013/0065667 A1* | 3/2013 | Nelson | G07F 17/3223 463/25 |
| 2013/0130779 A1* | 5/2013 | Gagner | G07F 17/3267 463/25 |
| 2015/0347889 A1* | 12/2015 | Nosaka | G06K 7/10 726/7 |

\* cited by examiner

GAMING SYSTEM WITH SECURE ELECTRONIC PAYMENT COUPON REDEMPTION

BACKGROUND OF THE INVENTION

The embodiments described herein relate generally to gaming systems and, more particularly, to systems and methods enabling secure redemption of electronic payment coupons.

At least some known gaming systems provide a "cash-out" feature that allows a player to receive credit from an electronic gaming machine (EGM) in the form of a printed paper ticket. For example, the ticket may include a ticket identifier (ID) encoded as a one-dimensional barcode. When the barcode is scanned by another EGM or a payment kiosk, the credit amount is provided to the player presenting the ticket.

Such known gaming systems may consume a considerable amount of paper. Further, paper tickets may be misplaced prior to redemption, potentially resulting in a financial loss by a player.

BRIEF DESCRIPTION OF THE INVENTION

In one aspect, one or more non-transitory computer-readable storage media are provided. The computer-readable storage media have embodied thereon computer-executable instructions. When executed by a computing device, the computer-executable instructions cause the computing device to associate, by the computing device, a cryptographic key with an electronic gaming machine (EGM) identifier (ID), and to receive, by the computing device, a coupon redemption request from a remote computing device. The coupon redemption request includes an electronic payment coupon that includes the EGM ID and a credit amount. The computer-executable instructions cause the computing device to authenticate, by the computing device, the electronic payment coupon based at least in part on the cryptographic key associated with the EGM ID, to transmit, by the computing device, a redemption confirmation to the remote computing device when the electronic payment coupon is successfully authenticated, and to store, by the computing device, a cancellation associated with the electronic payment coupon. The cancellation indicates that the electronic payment coupon has been redeemed for the credit amount.

In another aspect, an electronic gaming machine (EGM) is provided. The EGM includes a memory area, a display device, and a processor coupled to the memory area and the display device. The memory area stores an EGM identifier (ID) and a cryptographic key that are associated with the EGM. The display device is configured to display to a player a game outcome resulting from execution of a game of chance. The game outcome is associated with a credit amount. The processor is programmed to generate an electronic payment coupon including the credit amount and the EGM ID, to apply the cryptographic key associated with the EGM to at least a portion of the electronic payment coupon, and to provide the electronic payment coupon to the player.

In yet another aspect, a method for use with an electronic gaming machine (EGM) is provided. The method includes receiving, by an electronic payment coupon interface, an electronic payment coupon indicating a credit amount and EGM identifier (ID) of an EGM that issued the electronic payment coupon. A coupon redemption request including the electronic payment coupon is transmitted by a network interface to a remote computing device. A response, transmitted by the remote computing device in response to the coupon redemption request, is received by the network interface. When the response is a redemption confirmation, the credit amount of the electronic payment coupon is applied, by a processor, to a current gaming session associated with the EGM.

DETAILED DESCRIPTION OF THE INVENTION

Exemplary embodiments allow credits to be disbursed from electronic gaming machines (EGMs) in the form of electronic payment coupons that include the amount of credit disbursed. As described in more detail below, electronic payment coupons are secured against counterfeiting through the use of cryptographic keys associated with EGMs. Further, repeated redemption of electronic payment coupons may be prevented by canceling coupons upon first redemption.

Exemplary technical effects of systems and methods described herein include at least one of: (a) associating, by a computing device, a cryptographic key with an EGM identifier (ID); (b) receiving, by the computing device, a coupon redemption request from a remote computing device, the coupon redemption request including an electronic payment coupon that includes the EGM ID and a credit amount; (c) authenticating, by the computing device, the electronic payment coupon based at least in part on the cryptographic key associated with the EGM ID; (d) transmitting, by the computing device, a redemption confirmation to the remote computing device when the electronic payment coupon is successfully authenticated; (e) storing, by the computing device, a cancellation associated with the electronic payment coupon, wherein the cancellation indicates that the electronic payment coupon has been redeemed for the credit amount; (f) generating an electronic payment coupon including a credit amount and an EGM ID; (g) applying a cryptographic key associated with an EGM to at least a portion of the electronic payment coupon; (h) providing the electronic payment coupon to a player; (i) receiving, by an electronic payment coupon interface, an electronic payment coupon indicating a credit amount and EGM ID of an EGM that issued the electronic payment coupon; (j) transmitting, by a network interface, a coupon redemption request including the electronic payment coupon to a remote computing device; (k) receiving, by the network interface, a response transmitted by the remote computing device in response to the coupon redemption request; and (l) applying, by a processor, the credit amount of the electronic payment coupon to a current gaming session associated with the EGM when the response is a redemption confirmation.

Figure 1:
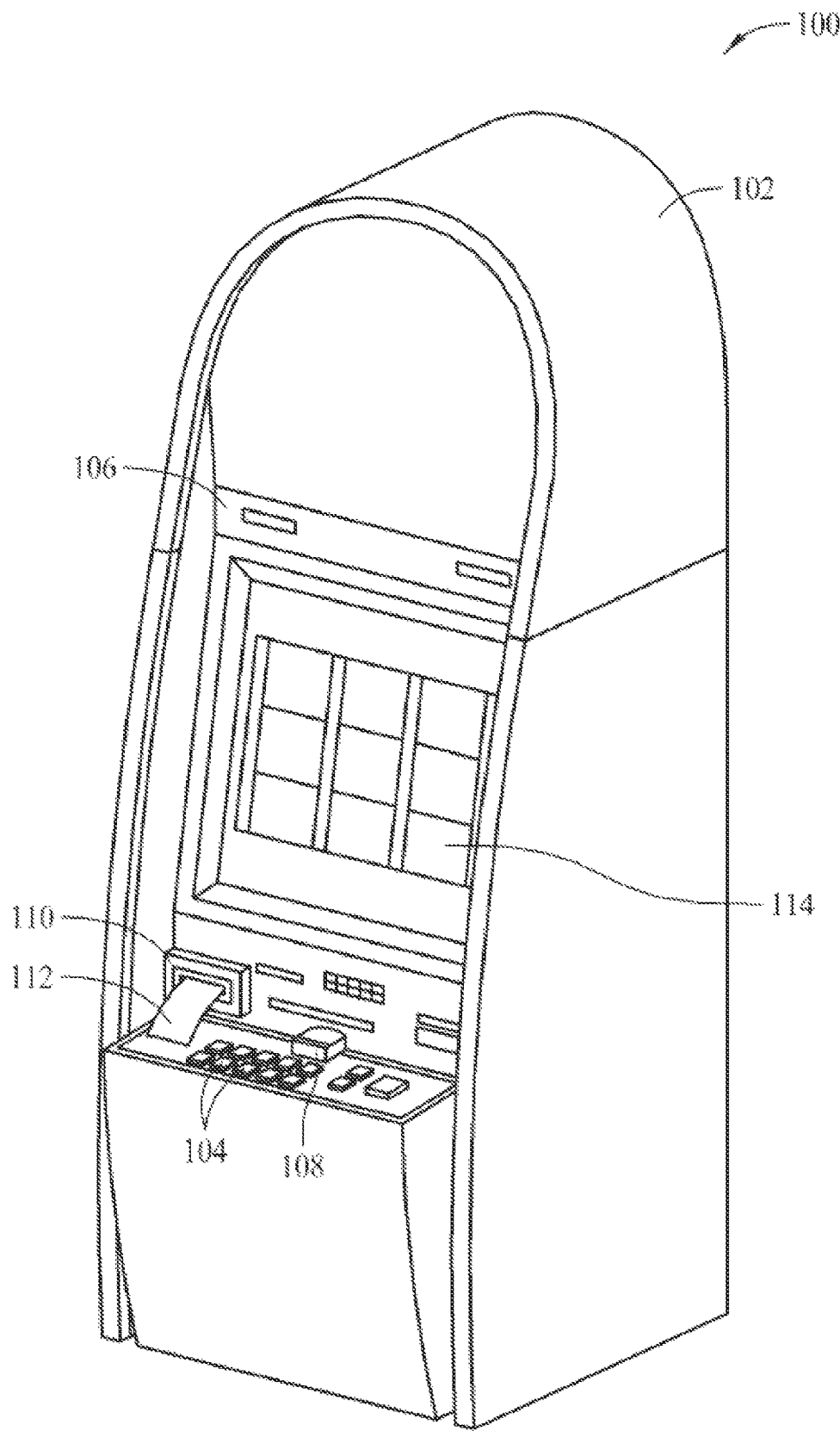
FIG. 1 is a schematic diagram of an exemplary electronic gaming machine (EGM).

FIG. 1 is a schematic diagram of an exemplary gaming machine 100 that enables a player to play one or more games of chance. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, display devices, and player interaction devices. For example, in an exemplary embodiment, gaming machine 100 includes a plurality of switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits. In exemplary embodiments, the payment may be provided as an electronic payment coupon, as described in more detail below.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112 as is described in greater detail below. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more display devices 114. Display devices 114 are mounted to cabinet 102, and may include a primary display device for displaying a primary game and a secondary display device for displaying a secondary or bonus game. Display devices 114 may include, without limitation, a plasma display, a liquid crystal display (LCD), and/or a display based on light emitting diodes (LEDs), organic light emitting diodes (OLEDs), polymer light emitting diodes (PLEDs), and/or surface-conduction electron emitters (SEDs). In an exemplary embodiment, display device 114 is used to display one or more game image, symbols and indicia such as a visual representation or exhibition of movement of an object such as a mechanical, virtual, or video reel, dynamic lighting, video images, and the like. In an alternative embodiment, display device 114 displays images and indicia using mechanical means. For example, display device 114 may include a physical or simulated electromechanical device, such as one or more rotatable reels, to display a plurality of game or other suitable images, symbols, or indicia.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator, a pseudo-random number generator, or any other suitable randomization process.

Figure 2:
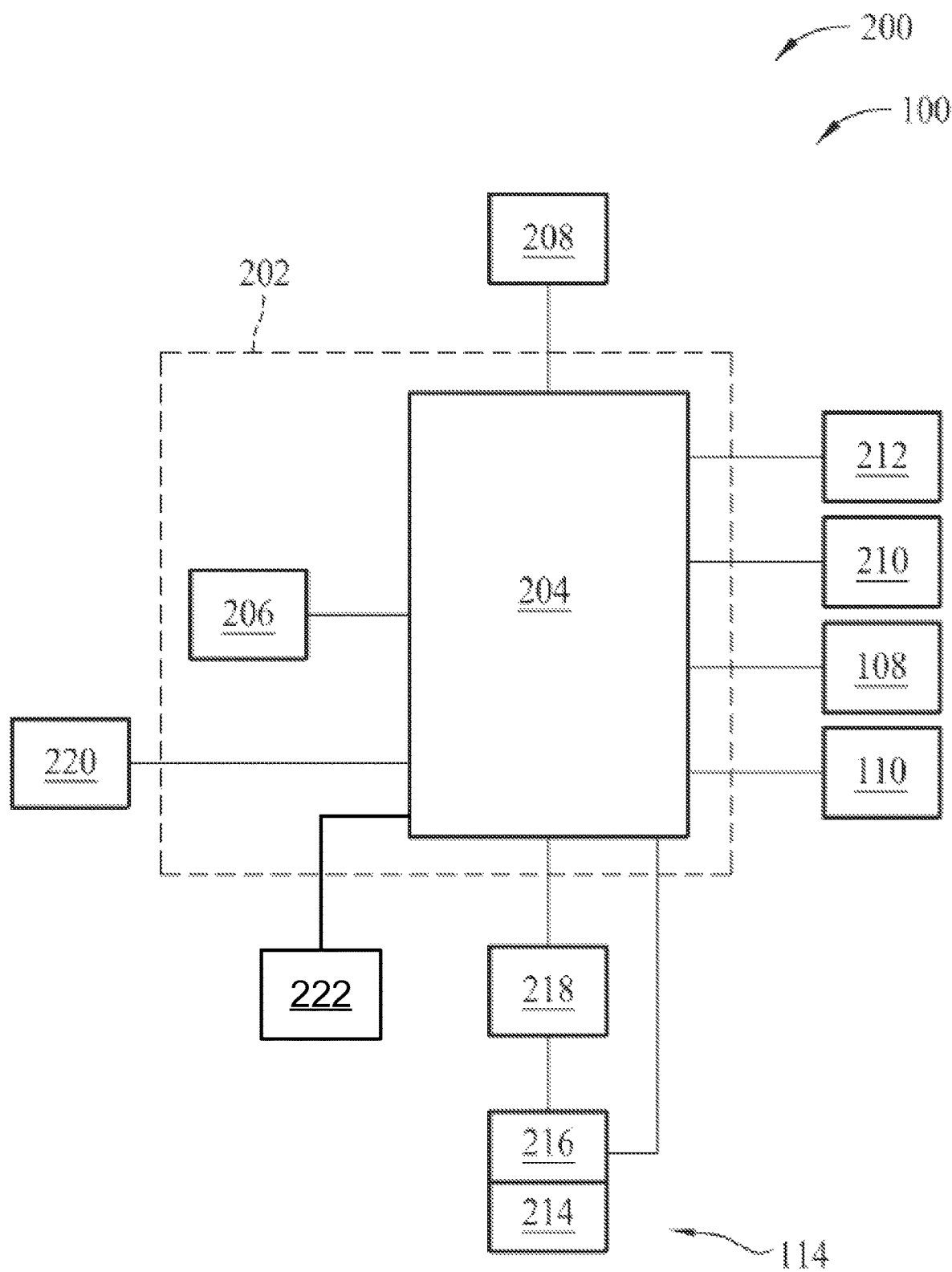
FIG. 2 is a schematic block diagram of an exemplary electrical architecture that may be used with the EGM shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled a memory area 206. Moreover, in the exemplary embodiment, processor 204 and memory area 206 reside within cabinet 102 (shown in FIG. 1) and may be collectively referred to herein as a "computer" or "controller." Controller 202 communicates with one or more other gaming machines 100 or other suitable devices via a network interface 208. Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 stores program code and instructions, executable by processor 204, for controlling gaming machine 100. For example, memory area 206 stores data such as image data, event data, player input data, random or pseudo-random number generation software, paytable data, and/or other information or applicable game rules that relate to game play on gaming machine 100. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination.

In the exemplary embodiment, gaming machine 100 includes a credit display 210, which displays a player's current number of credits, cash, account balance or the equivalent. Gaming machine 100 also includes a bet display 212 which displays a player's amount wagered. Credit display 210 and bet display 212 may be standalone displays independent of display device 114, or credit display 210 and bet display 212 may be incorporated into display device 114.

Moreover, in an exemplary embodiment, display device 114 is controlled by controller 202. In some embodiments, display device 114 includes a touch screen 214 and an associated touch screen controller 216. A video controller 218 is communicatively coupled to controller 202 and touch screen controller 216 to enable a player to input game play decisions into gaming machine 100 via touch screen 214. Furthermore, gaming machine 100 includes one or more communication ports 220 that enable controller 202 to communicate with external peripheral devices (not shown) such as, but not limited to, external video sources, expansion buses, game or other displays, a SCSI port, or a key pad.

In exemplary embodiments, gaming machine 100 includes an electronic payment coupon interface 222 that receives and/or provides electronic payment coupons. In some embodiments, electronic payment coupon interface 222 includes an optical input device (e.g., a camera and/or a scanner) configured to scan a barcode image displayed by a computing device, such as a smart phone. In addition, or alternatively, electronic payment coupon interface 222 includes a communication device with a transceiver, such as a near field communication (NFC) device.

In some embodiments, electronic payment coupon interface 222 may be integrated with one or more other components of gaming machine 100. For example, gaming machine 100 may provide an electronic payment coupon encoded as a barcode image by displaying the barcode image using display 114. As another example, gaming machine 100 may provide an electronic payment coupon by transmitting the electronic payment coupon using network interface 208.

Figure 3:
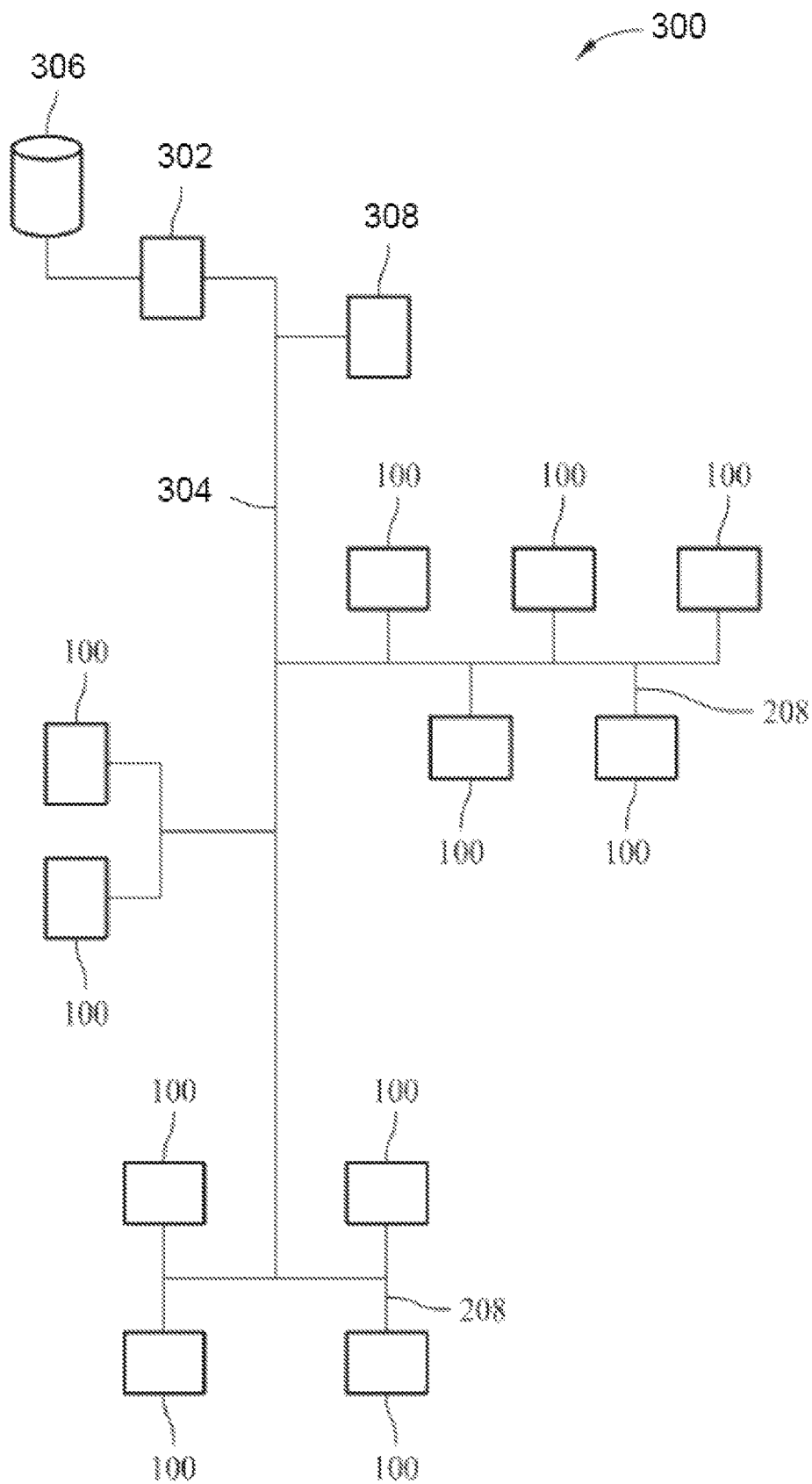
FIG. 3 is a block schematic diagram of an exemplary gaming system that includes a plurality of EGMs shown in FIG. 1.

FIG. 3 is a block schematic diagram of an exemplary gaming system 300 that includes a plurality of gaming machines 100. Each gaming machine 100 is coupled via network interface 208 to one or more servers, such as a gaming server 302, using a network 304. Gaming server 302 includes a processor (not shown) that facilitates data communication between each gaming machine 100 and other components of gaming system 300. Such data is stored in, for example, a memory area 306, such as a database, that is coupled to gaming server 302.

As described above, gaming machines 100 may include video bingo machines, video poker machines, video slot machines, and/or other similar gaming machines that implement alternative games. Moreover, gaming machines 100 may be terminal-based machines, wherein the actual games, including random number generation and/or outcome determination, are performed at gaming server 302. In such an embodiment, gaming machine 100 displays results of the game (e.g., game symbol combinations and/or prizes) via display device 114 (shown in FIGS. 1 and 2).

Moreover, in the exemplary embodiment, gaming system 300 includes a configuration workstation 308 that includes a user interface that enables an administrator to set up and/or to modify portions of gaming system 300 and/or gaming server 302. Gaming server 302 may perform a plurality of functions including, for example, game outcome generation, player tracking functions, and/or accounting functions. However, in alternative embodiments, gaming system 300 may include a plurality of servers 302 that separately perform these functions and/or any suitable function for use in a network-based gaming system. In the exemplary embodiment, gaming server 302 provides an electronic payment coupon redemption service, as described in more detail below.

Moreover, in some embodiments, gaming server 302 tracks data of players using gaming machines 100, and also controls messages that appear on display device 114 of gaming machines 100. For example, gaming server 302 can store physical characteristics of players, such as, but not limited to, the player age. Gaming server 302 can also store data related to the players and tracked using player tracking identification, such as a player card. Moreover, gaming server 302 can store information and data about the player such as loyalty points, player address, phone number, and/or any information that may be retrieved and transmitted to gaming machines 100. In some embodiments, gaming server 302 stores and tracks information such as, but not limited to, the average amount of wager played at gaming machine 100. Moreover, gaming server 302 can track an average amount of wagers by the player, any funds the player may have in an account, and data relating to reportable events. Such data is associated with individual players and logged using a taxable accrual log.

Furthermore, and in the exemplary embodiment, gaming server 302 is configured to store data used in redeeming electronic payment coupons. For example, gaming server 302 may store cryptographic keys associated with EGM IDs, with each EGM ID identifying an individual EGM. Gaming server 302 may also, upon confirming redemption of an electronic payment coupon, store a cancellation of the coupon, creating a record of the redemption (e.g., for use in compensating the disburser of the credit) and/or enabling subsequent redemption of the coupon to be prevented.

Figure 4:
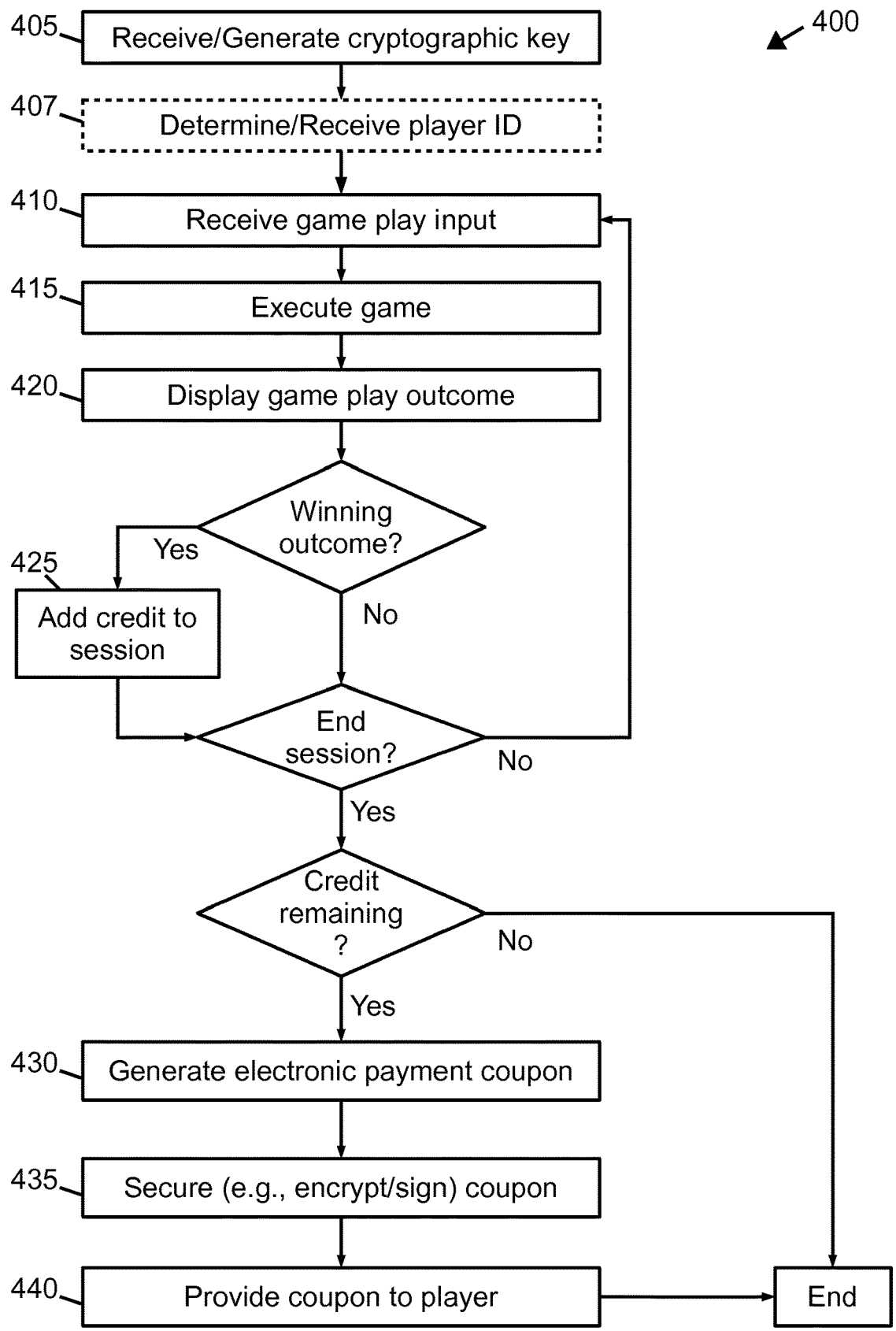
FIG. 4 is a flowchart that illustrates an exemplary method for providing an electronic payment coupon to a player at an EGM, such as the EGM shown in FIGS. 1-3.

FIG. 4 is a flowchart 400 that illustrates an exemplary method for providing an electronic payment coupon to a player at an EGM, such as gaming machine 100 (shown in FIGS. 1-3). Referring to FIGS. 3 and 4, although operations are described below with respect to particular computing devices, such as gaming machine 100 and gaming server 302, embodiments described enable such operations to be performed by any computing device.

In exemplary embodiments, EGM 100 receives and/or generates 405 one or more cryptographic keys (e.g., a private key and/or a public key, as in public-key cryptography) associated with EGM 100. For example, EGM 100 may receive 405 the cryptographic key from gaming server 302 and/or by manual copying of the key to EGM 100 by a human operator. In some embodiments, gaming server 302 generates the cryptographic key associated with EGM 100 and may electronically sign the cryptographic key using another cryptographic key associated with gaming server 302, thereby providing evidence that the key originated at gaming server 302. In other embodiments, EGM 100 generates 405 the cryptographic key and provides the key to gaming server 302.

EGM 100 receives 410 game play input (e.g., a credit deposit, a game selection, and/or a button press) from a player at a gaming machine 100. Based on the game play input, a game of chance is executed 415 by gaming machine 100 and/or gaming server 302, creating a game play outcome. (In embodiments where gaming server 302 performs the execution 415, the game play input may be provided to gaming server 302 by gaming machine 100 via network 304.) EGM 100 displays 420 (e.g., using display device 114) the game play outcome to the player. The game play outcome may include a winning outcome (e.g., associated with a credit amount, or prize) or a non-winning outcome.

If execution 415 of the game results in a winning outcome, EGM 100 adds 425 the credit amount associated with the outcome to the current gaming session. If the outcome is a non-winning outcome, no credit is added 425. Further, in exemplary embodiments, each execution 415 of a game of chance subtracts credit from the gaming session. Game play may be performed as described above until the gaming session ends. A gaming session may extend, for example, until the player selects an end game play (e.g., "cash out") option, and/or until the time between game executions 415 does not exceed a predetermined timeout value.

When the gaming session ends, if any credit remains in the session, EGM 100 generates 430 an electronic payment coupon that indicates the credit amount. In exemplary embodiments, EGM 100 stores an EGM identifier (ID) and the cryptographic key that are associated with EGM 100 (e.g., in memory area 206, shown in FIG. 2). In such embodiments, EGM 100 generates 430 an electronic payment coupon that includes the credit amount, the EGM ID, and/or a coupon ID. For example, the coupon ID may include the EGM ID and a serial number that is incremented by EGM 100 each time an electronic payment coupon is generated 430. As another example, the coupon ID may include the EGM ID and a timestamp indicating the date and time at which EGM 100 generated 430 the electronic payment coupon. Such a coupon ID enables the electronic payment coupon to be distinguished from other coupons generated 430 by EGM 100, and from coupons generated by other EGMs.

In exemplary embodiments, EGM 100 secures 435 the electronic payment coupon using the cryptographic key associated with EGM 100 by applying the cryptographic key to at least a portion of the electronic payment coupon. In some embodiments, EGM 100 may secure 435 the coupon by encrypting the content (e.g., the credit amount and/or the coupon ID) of the coupon using the cryptographic key associated with EGM 100. At least a portion of the coupon content (e.g., the EGM ID) may be left unencrypted, or at least a portion of the content may be provided in both encrypted and unencrypted form within the coupon. Providing the EGM ID in unencrypted form, for example, enables subsequent lookup of the appropriate cryptographic key for use in authenticating the coupon, as described below with reference to FIG. 5.

In other embodiments, EGM 100 secures 435 the electronic payment coupon by digitally signing the coupon. For example, EGM 100 may digitally sign the coupon by calculating a hash value (e.g., using a hash function, such as MD5 or SHA-1) of at least a portion of the coupon content, encrypting the hash value using the cryptographic key associated with EGM 100, and including the encrypted hash value in the electronic payment coupon.

EGM 100 provides 440 the electronic payment coupon to the player. In some embodiments, EGM 100 provides 440 the coupon by causing display device 114 to display the electronic payment coupon. For example, EGM 100 encode the electronic payment coupon as a barcode image (e.g., a two-dimensional or three-dimensional barcode image) and display this barcode image.

In addition, or alternatively, EGM 100 may provide 440 the electronic payment coupon by transmitting the electronic payment coupon to a computing device associated with the player. For example, EGM 100 may transmit the coupon using near field communication (NFC), a personal area network (PAN), and/or any other type of network.

Some embodiments protect against inadvertently providing 440 an electronic payment coupon to a player other than the player associated with the recently ended gaming session. In such embodiments, prior to, and/or during, game play, EGM 100 determines 407 a player ID that is associated with the player using EGM 100. For example, EGM 100 may determine 407 the player ID by receiving the player ID from the player (e.g., using touch screen 214). As another example, EGM 100 may receive the player ID from a device associated with the player and presented by the player prior to execution 415 of a game. Such a device may include, without limitation, a computing device (e.g., a smart phone and/or a electronic wand device), an RFID tag, an ID card (e.g., including a magnetic stripe), and/or any other device capable of uniquely identifying the player. EGM 100 provides 440 the electronic payment coupon by transmitting the coupon to a computing device based on determining that the computing device is associated with the player ID. For example, the computing device may be the same one that provided the player ID to EGM 100 and/or may have been previously associated with the player ID of the player.

Figure 5:
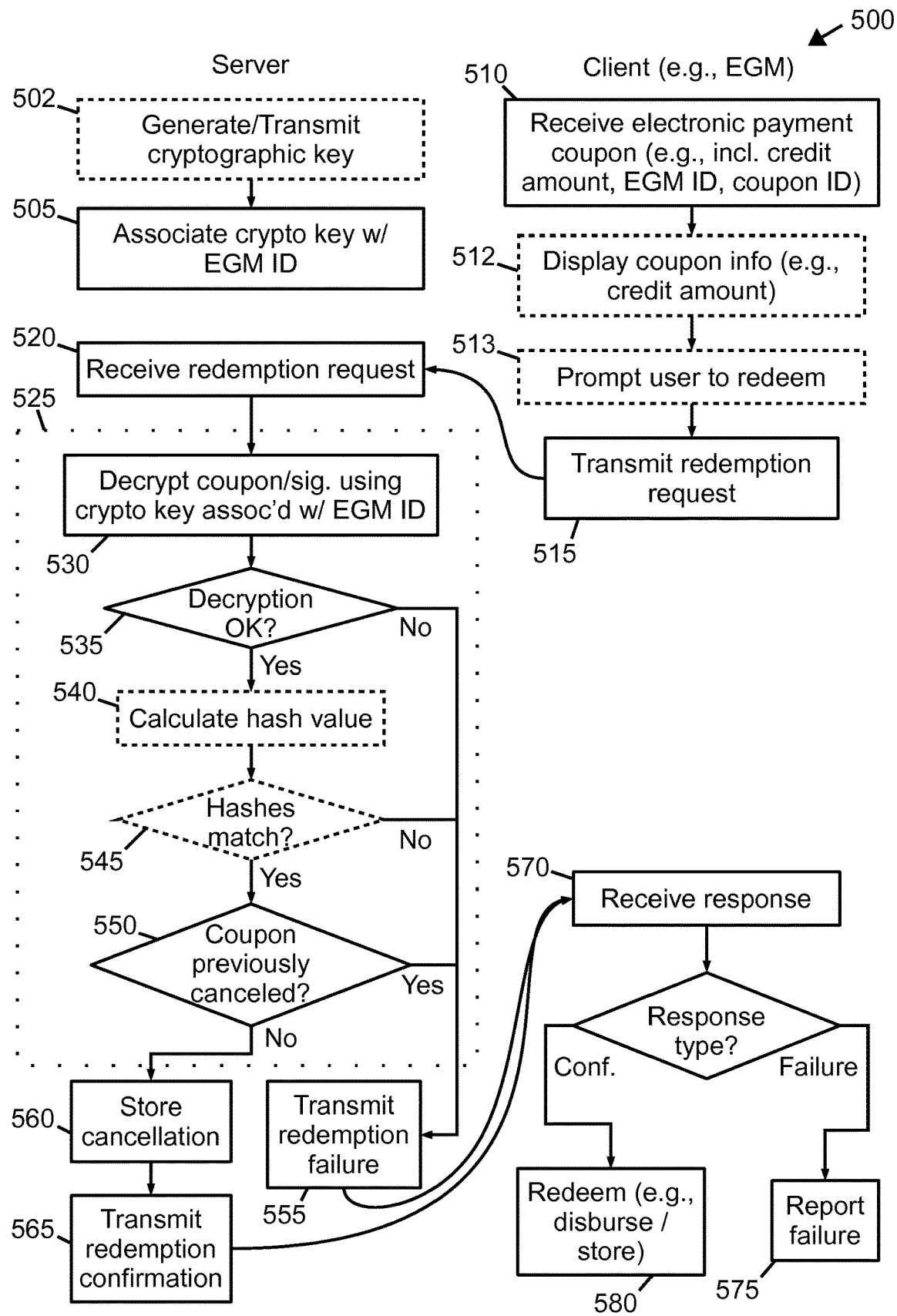
FIG. 5 is a flowchart that illustrates an exemplary method for redeeming an electronic payment coupon using the gaming system shown in FIG. 3.

FIG. 5 is a flowchart 500 that illustrates an exemplary method for redeeming an electronic payment coupon using gaming system 300 (shown in FIG. 3). Referring to FIGS. 3 and 5, in exemplary embodiments, before an electronic payment coupon is provided to a player (e.g., as described above with reference to FIG. 4), gaming server 302 associates 505 a cryptographic key with the EGM ID that identifies EGM 100. Gaming server 302 may store many such associations in a memory area. In some embodiments, gaming server 302 generates and/or transmits 502 the cryptographic key to EGM 100.

In exemplary embodiments, a client computing device, or "client," communicates with a remote server computing device, or "server," such as gaming server 302. The client may be the same EGM 100 that issued the electronic payment coupon being redeemed, a different EGM 100, or another computing device, such as a coupon redemption kiosk operated by a casino (e.g., the operator of EGMs 100) or a point-of-sale (POS) device operated by a merchant (e.g., a restaurant) that accepts electronic payment coupons as a form of payment.

The client receives 510 an electronic payment coupon indicating a credit amount and an EGM identifier (ID) of the EGM 100 that issued the electronic payment coupon. In exemplary embodiments, the client receives 510 the electronic payment coupon using an electronic payment coupon interface (e.g., electronic payment coupon interface 222 of EGM 100, shown in FIG. 2). In some embodiments, the electronic payment coupon interface includes an optical input device, and the client receives 510 the coupon by scanning a barcode image of the coupon presented by the user of the client. For example, the barcode image may be displayed by a computing device (e.g., a smart phone or other handheld device) operated by the user. In other embodiments, the client receives 510 the coupon by receiving a transmission of the electronic payment coupon from such a computing device using near field communication, a personal area network (PAN), and/or any other type of network.

The client transmits 515 (e.g., using a network interface such as network interface 208 of EGM 100, shown in FIG. 2) a coupon redemption request including the electronic payment coupon to gaming server 302. The electronic payment coupon received 510 by the client and transmitted 515 with the redemption request includes coupon content or information such as a credit amount, the EGM ID of the EGM that issued the coupon, and a coupon ID. In some embodiments, prior to transmitting 515 the redemption request, the client displays 512 (e.g., using a display device such as display device 114 of EGM 100, shown in FIG. 2) at least a portion of the coupon information, such as the credit amount, to the user and prompts 513 the user to confirm that the electronic payment coupon should be redeemed. The redemption request is transmitted 515 when the user confirms that the electronic payment coupon should be redeemed.

Gaming server 302 receives 520 the coupon redemption request, which includes the electronic payment coupon, from the client. Gaming server 302 determines whether the coupon should be redeemed by authenticating 525 the electronic payment coupon based at least in part on the cryptographic key associated with the EGM ID indicated by the coupon.

In exemplary embodiments, gaming server 302 authenticates 525 the electronic payment coupon at least in part by decrypting 530 at least a portion of the electronic payment coupon using the cryptographic key associated with the EGM ID. For example, the electronic coupon may include coupon information (e.g., the EGM ID, the credit amount, and the coupon ID) in both encrypted and unencrypted form, in which case gaming server 302 may decrypt 530 the encrypted information and determine 535 whether the decryption 530 was successful. The decryption 530 may be considered successful if the output of decrypting 530 the encrypted information is coupon information including expected values, such as the corresponding unencrypted coupon information and/or one or more predetermined legal values (e.g., alphanumeric strings with only printable characters, positive rational numeric values, etc.), and/or coupon information including values within one or more predetermined ranges (e.g., a credit amount greater than zero and less than or equal to a maximum credit amount). If the decryption 530 is unsuccessful, the authentication 525 is also unsuccessful. If the decryption 530 is successful, authentication 525 continues as described below.

In some embodiments, the electronic payment coupon includes a digital signature with a hash value representing the content of the coupon. In such an embodiment, gaming server 302 decrypts 530 the digital signature (e.g., the hash value) using the cryptographic key associated with the EGM ID in the coupon, calculates 540 (e.g., using a hash function, such as MD5 or SHA-1) a hash value of the unencrypted content of the electronic payment coupon, verifies 545 that the hash value in the digital signature equals the calculated hash value. If the verification 545 is unsuccessful, the authentication 525 is also unsuccessful. If the verification 545 is successful, authentication 525 continues as described below.

In exemplary embodiments, the authentication 525 performed by gaming server 302 also includes determining 550 whether the electronic payment coupon has previously been canceled. As described below, upon successful redemption of a coupon, gaming server cancels the coupon by storing a cancellation record. In exemplary embodiments, gaming server 302 determines 550 whether the coupon ID of the electronic payment coupon received 520 is already associated with a cancellation. If so, authentication 525 is unsuccessful. If not, authentication 525 is successful, and the coupon may be redeemed.

In response to the redemption request, gaming server 302 transmits a response to the client indicating whether redemption of the electronic payment coupon should proceed. When authentication 525 of the coupon fails for any reason, gaming server 302 transmits 555 a redemption failure to the client. When the authentication 525 succeeds, gaming server 302 stores 560 a cancellation associated with the electronic payment coupon, indicating that the electronic payment coupon has been redeemed for the credit amount specified by the electronic payment coupon, and transmits 565 a redemption confirmation (e.g., including at least a portion of the coupon and/or cancellation information) to the client.

In exemplary embodiments, the cancellation stored 560 by gaming server 302 includes at least a portion of the coupon information (e.g., the coupon ID and the credit amount). The cancellation may include other information, such as a timestamp indicating the date and time at which the coupon was redeemed, an ID of the cancellation (e.g., assigned by gaming server 302), an ID of the client requesting redemption, an ID of the user (if any) operating the client, and/or any other data suitable for use with the methods described herein. Notably, in some embodiments, the credit amount is not stored by gaming server 302 prior to storing 560 the cancellation. For example, the EGM 100 that issues the electronic payment coupon need not communicate the coupon information directly to gaming server 302. Rather, the coupon may be provided when submitted for redemption. Such an implementation enables a credit to be provided to a player without requiring multiple exchanges of information between gaming server 302 and other computing devices.

The client receives 570 the response transmitted by gaming server 302. If the response is a redemption failure, the client reports 575 a failure in the redemption process. In some embodiments, the redemption failure transmitted 555 by gaming server 302 includes a failure reason indicating why authentication 525 of the coupon failed. For example, the failure reason may indicate that the coupon could not be decrypted using the cryptographic key associated with the issuing EGM ID, and/or that the coupon has already been redeemed. The client may provide such a failure reason when reporting 575 the redemption failure.

If the response is a redemption confirmation, the client redeems 580 the electronic payment coupon, disbursing the credit amount and, optionally, storing a record of the redemption (e.g., including coupon and/or cancellation information provided by gaming server 302 in the redemption confirmation). Disbursing the credit amount may include, for example, applying a credit equal to the credit amount to a customer bill and/or dispensing cash equal to the credit amount. Optionally, a redemption charge may be subtracted from the credit amount and allocated to the operator of the client as part of the redemption 580. In such cases, the credit applied and/or cash dispensed may be equal to the credit amount specified by the electronic payment coupon minus the redemption charge.

In some embodiments, the client is an EGM 100. In such an embodiment, EGM 100 disburses the credit amount by applying the credit amount to a current gaming session associated with EGM 100. Such application of credit from the electronic payment coupon increases the current credit amount of the gaming session, similar to application of credit (e.g., cash and/or tokens) deposited directly by the player at EGM 100. Game play at EGM 100 may continue as described above with reference to FIG. 4, and EGM 100 may provide 440 (shown in FIG. 4) a second electronic payment coupon to the player when the gaming session ends.

As mentioned above, secure electronic payment coupons, as described herein, are protected against multiple redemption attempts, whether inadvertent or fraudulent. In some cases, after a first coupon redemption request for a particular electronic payment coupon is processed, and the coupon successfully redeemed, gaming server 302 may receive 520 a second coupon redemption request including the same electronic payment coupon. Assuming the coupon was successfully authenticated 525 when processing the first coupon redemption request, gaming server 302 may be expected to successfully decrypt 530 the coupon and, if a digital signature is provided, successfully verify 545 that the hash value in the digital signature matches the hash value calculated 540. However, gaming server 302 determines 550 that the electronic payment coupon has previously been redeemed based on the cancellation associated with the coupon that was previously stored 560, and transmits 555 a redemption failure based on the stored cancellation.

Exemplary embodiments of systems and methods for providing secure electronic payment coupons are described above in detail. The systems and methods are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, computing device, controller, or server, such as those described herein (e.g., an electronic gaming machine and/or a gaming server), includes at least one processor or processing unit and a system memory. The computer, controller, or server typically has at least some form of computer-readable storage media. By way of example and not limitation, computer-readable media include computer-readable storage media and communication media. Computer-readable storage media include removable and non-removable devices implemented in any method or technology for storage of information such as computer-executable instructions, data structures, program modules, or other data. A computing device may be programmed to perform at least a portion of the operations described herein by, for example, encoding such operations as computer-executable instructions, providing the computer-executable instructions in a computer-readable storage media, and configuring the computing device to execute the instructions in the computer-readable storage media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming machine (EGM) comprising:
   a memory area storing an EGM identifier (ID) and a cryptographic key, the EGM ID and the cryptographic key both being uniquely associated with the EGM, wherein the memory area further stores a plurality of instructions;
   a display device configured to display to a player a game outcome resulting from execution of a game of chance, wherein the game outcome is associated with a credit amount; and
   a processor coupled to the display device and the memory area, wherein the processor, upon executing the plurality of instructions stored in the memory area, causes the processor to at least:
      generate an electronic payment coupon including (i) an electronic payment coupon identifier (ID), (ii) a credit balance associated with a gaming session of the game of chance and (iii) the EGM ID in response to a cash-out request at the end of the gaming session;
      generate a digital signature for the electronic payment coupon by applying the cryptographic key associated with the EGM to at least one of (i) the electronic payment coupon ID, (ii) the credit balance, and (iii) the EGM ID;
      apply the digital signature to the electronic payment coupon to generate a signed electronic payment coupon, wherein the signed electronic payment coupon includes both an encrypted version and an unencrypted version of at least one of (i) the electronic payment coupon ID, (ii) the credit balance, and (iii) the EGM ID; and
      transmit the signed electronic payment coupon to a computing device associated with the player from the EGM, at least a portion of the signed electronic payment coupon being displayable on the computing device of the player.

2. The EGM in accordance with claim 1, wherein the processor, upon executing the plurality of instructions stored in the memory area, further causes the processor to at least:
   encode the signed electronic payment coupon as a barcode image; and
   transmit the barcode image to the display device, wherein the display device is further configured to display the barcode image.

3. The EGM in accordance with claim 2, wherein the processor, upon executing the plurality of instructions stored in the memory area, further causes the processor to at least encode the signed electronic payment coupon as a two-dimensional barcode image.

4. The EGM in accordance with claim 1, wherein the processor, upon executing the plurality of instructions stored in the memory area, further causes the processor to at least transmit the signed electronic payment coupon to the computing device using near field communication.

5. The EGM in accordance with claim 1, wherein the processor, upon executing the plurality of instructions stored in the memory area, further causes the processor to at least:
   determine a player ID associated with the player; and
   transmit the signed electronic payment coupon to the computing device based on determining that the computing device is associated with the player ID.

6. The EGM in accordance with claim 5, wherein the processor, upon executing the plurality of instructions stored in the memory area, further causes the processor to at least receive the player ID from a device presented by the player prior to the execution of the game of chance.

7. The EGM in accordance with claim 1, wherein the electronic payment coupon ID includes the EGM ID and at least one of a timestamp and a counter value associated with the EGM.

8. The EGM in accordance with claim 1, wherein the electronic payment coupon includes an encrypted version of the EGM ID and an unencrypted version of the EGM ID.

9. The EGM in accordance with claim 1, wherein the digital signature is a hash value based on the cryptographic key.

\* \* \* \* \*